United States Patent
Zhi et al.

(10) Patent No.: US 12,412,955 B2
(45) Date of Patent: Sep. 9, 2025

(54) LITHIUM-ION BATTERY SEPARATOR, PREPARATION METHOD THEREOF, AND LITHIUM-ION BATTERY PREPARED THEREFROM

(71) Applicant: QINGDAO LANKETU MEMBRANE MATERIALS CO., LTD, Qingdao (CN)

(72) Inventors: Lipeng Zhi, Qingdao (CN); Yanpeng Ma, Qingdao (CN); Yuzhen Jiang, Qingdao (CN); Yibo Hu, Qingdao (CN); Peng Liu, Qingdao (CN); Jiapeng Sun, Qingdao (CN); Yanfei Gong, Qingdao (CN); Zuozheng Zhang, Qingdao (CN)

(73) Assignee: QINGDAO LANKETU MEMBRANE MATERIALS CO., LTD, Qingdao (CN)

( * ) Notice: Subject to any disclaimer, the term of this patent is extended or adjusted under 35 U.S.C. 154(b) by 132 days.

(21) Appl. No.: 18/183,981

(22) Filed: Mar. 15, 2023

(65) Prior Publication Data
US 2023/0216140 A1    Jul. 6, 2023

Related U.S. Application Data

(63) Continuation of application No. PCT/CN2020/142169, filed on Dec. 31, 2020.

(30) Foreign Application Priority Data

Nov. 16, 2020   (CN) .......................... 202011277996.2

(51) Int. Cl.
B29C 48/08     (2019.01)
B29C 48/00     (2019.01)
(Continued)

(52) U.S. Cl.
CPC ....... *H01M 50/403* (2021.01); *B29C 48/0018* (2019.02); *B29C 48/08* (2019.02);
(Continued)

(58) Field of Classification Search
CPC ... B29C 48/08; B29C 48/0018; B29C 55/143; B29K 2023/12; B29K 2105/0041; B29L 2031/3468
(Continued)

(56) References Cited

U.S. PATENT DOCUMENTS

2017/0335078 A1* 11/2017 Defoer ................ B29C 48/0018
2019/0393463 A1* 12/2019 Cheng ............... H01M 10/0525

FOREIGN PATENT DOCUMENTS

CN         101000952 A  *  7/2007
CN         102241832 A     11/2011
(Continued)

*Primary Examiner* — Jeffrey M Wollschlager
*Assistant Examiner* — Xue H Liu
(74) *Attorney, Agent, or Firm* — Nitin Kaushik

(57) ABSTRACT

A lithium-ion battery separator with high-temperature resistance, a preparation method thereof and a lithium-ion battery prepared therefrom fall within the field of lithium-ion battery separators. The separator has a thickness of 3.5-30 μm, a porosity of 30-80%, an adjustable pore size of 20-2000 nm, a biaxial tensile strength of ≥50 MPa, an air permeability of ≤400 s/100 cc, and a breaking temperature of ≥160° C. The preparation method comprises the following steps: mixing, melting, and plasticizing 20%-60% of a polypropylene main material, 2%-10% of a solubilizer, 30%-80% of a solvent, 0.1%-5% of a nucleating aid and/or 0.1%-1% of an antioxidant, carrying out twin-screw extrusion, carrying out thermally induced phase separation to obtain a cast sheet, and carrying out cast sheet stretching, extraction, and post-treatment or directly carrying out extraction and post-treatment. The separator has the characteristics of high-tempera-
(Continued)

ture resistance, biaxial high strength, uniform pore size, high specific resistance.

7 Claims, 2 Drawing Sheets

(51) Int. Cl.
    *B29C 55/14*     (2006.01)
    *H01M 50/403*     (2021.01)
    *H01M 50/417*     (2021.01)
    *B29K 23/00*     (2006.01)
    *B29K 105/00*     (2006.01)
    *B29L 31/34*     (2006.01)
    *H01M 10/0525*     (2010.01)

(52) U.S. Cl.
    CPC ......... *B29C 55/143* (2013.01); *H01M 50/417* (2021.01); *B29K 2023/12* (2013.01); *B29K 2105/0041* (2013.01); *B29L 2031/3468* (2013.01); *H01M 10/0525* (2013.01)

(58) Field of Classification Search
    USPC ...................................................... 264/210.7
    See application file for complete search history.

(56) References Cited

FOREIGN PATENT DOCUMENTS

| | | | | |
|---|---|---|---|---|
| CN | 102320133 A | * | 1/2012 | |
| CN | 102544514 A | | 7/2012 | |
| CN | 105355811 A | | 2/2016 | |
| EP | 2708359 A1 | * | 3/2014 | ......... B29C 48/0018 |

* cited by examiner

LITHIUM-ION BATTERY SEPARATOR, PREPARATION METHOD THEREOF, AND LITHIUM-ION BATTERY PREPARED THEREFROM

CROSS-REFERENCE TO RELATED APPLICATIONS

The application claims priority to Chinese patent application No. 202011277996.2, filed on Nov. 16, 2020, the entire contents of which are incorporated herein by reference.

TECHNICAL FIELD

The present invention relates to the field of lithium-ion battery separators, and more particularly, to a lithium-ion battery separator with high-temperature resistance.

The present invention also provides a method for preparing the aforesaid lithium-ion battery separator with high-temperature resistance.

The present invention also provides a lithium-ion battery prepared from the lithium-ion battery separator with high-temperature resistance.

BACKGROUND

Since the development of lithium-ion battery separators, the main technical routes are divided into two major routes: polypropylene dry separator and polyethylene wet separator. In the dry process, polypropylene is used as the main raw material, and a melt-stretching process is adopted, which is subdivided into dry uniaxial stretching and dry biaxial stretching. In the wet process, polyethylene is used as the main raw material. The wet process can be divided into biaxial synchronous stretching and asynchronous stretching according to different stretching modes.

Since the polypropylene with a relatively high melting point is used as the main raw material in the conventional dry process, the separator obtained has a relatively high melting point, high breaking temperature, and good heat resistance. A typical dry-process polypropylene film can maintain a thermal shrinkage stability of more than 140° C. and a breaking temperature of more than 160° C. However, due to the forming process, the main dry-process separator is mainly stretched by a small ratio in the Machine Direction (MD and Transverse Direction (TD) or is stretched in a uniaxial direction. The separator has obvious MD and TD anisotropy, insufficient TD tensile strength, and relatively low puncture strength, which can only be compensated by increasing the thickness. The pore-forming mechanism of the dry-process film is that the polymer is crystallized under high stress during melt extrusion to form platelets perpendicular to the stretching direction, then heat-treated to obtain a hard elastic material, then stretched to form micropores by dislocating and separating the platelets, and finally heat-set to obtain a microporous film. The pore is straight-through, and the porosity is generally 35-45%, Because this method forms straight-through pores, the degree of tortuosity of the pore is low. There are problems of large equivalent pore size and short equivalent hole length, which easily lead to micro-short between positive and negative electrodes and large self-discharge. Based on the above problems, the dry-process separator can only be applied to low-end products with a large thickness and is difficult to be applied to high-end fields.

Since a high molecular weight polyethylene is used in the conventional wet process, the separators obtained have high biaxial tensile strength and puncture strength. The pore-forming mechanism is based on the thermally induced phase separation principle combined with oil film stretching. The pores are formed by the superposition of multi-layer network structures formed by stretching and dislocation of fine and uniform sphere crystalline platelets and continuous fibration. The pore size distribution is fine and uniform, the equivalent pore size is small and the equivalent pore length is large. The separators can still maintain good electric resistance in the range of ultra-thin thickness (e.g. 4-9 μm), which has wider high-end applications. However, based on the lower softening point and melting point of the main material polyethylene itself, the wet polyethylene separator has a relatively poor heat resistance and low breaking temperature. The typical wet polyethylene separator can only guarantee thermal shrinkage stability of less than 120° C. and breaking temperature of less than 140° C. However, a large proportion of high-end lithium-ion battery products use the high-nickel ternary system. The active characteristics of positive active materials have high requirements for the thermal stability of the separator. These contradictions have led to an increase in battery safety risks.

In order to take into account the high-temperature resistance, mechanical properties, electrochemical functions, and other factors, the prior art mainly has remedial measures for improving the dry-process polypropylene separator, such as increasing the TD tensile rate to improve the TD strength, coating small particle size ceramics to compensate for the problem of larger pore size. But the strength improvement level is limited, and the uniformity of pores cannot reach the level of a wet polyethylene separator. The prior art mainly has remedial measures for improving the dry polypropylene separator, such as coating the wet polyethylene separator with an inorganic substance or an organic substance, such as ceramic, aramid, boehmite, PI, etc. However, in addition to the problem of coating the inorganic substance or organic substance on the surface of the separator would certainly cause a certain degree of pore size blockage, the rapid decrease of the mechanical strength of the polyethylene separator itself under high heat conditions would also result in the deterioration effect that a thing cannot exist without its basis. When near the melting point of 140° C., even if the separator has a coating to protect against shrinkage, it would cause a large-area short circuit of the positive and, negative electrodes due to the melting of the separator itself.

Therefore, there is a need for a lithium-ion battery separator with high-temperature stability, excellent mechanical properties, high porosity, and uniformly adjustable pore size to solve the above technical problems.

In view of this, the present application is hereby filed.

SUMMARY

An object of the present invention is to provide a lithium-ion battery separator with high-temperature resistance, and a method for preparing the same, so as to solve the above problems.

To achieve the above object, in particular, the present invention provides the following technical solutions:

A lithium-ion battery separator with high-temperature resistance, the separator having a thickness of 3.5-30 μm, a porosity of 30-80%, an adjustable pore size of 20-2000 nm, a biaxial tensile strength of ≥50 MPa, an air permeability of ≤400 s/100 cc, and a breaking temperature of ≥160° C.

Preferably, the separator has a thickness of 3.5-20 µm, a porosity of 35-60%, a pore size of 30-100 nm, a biaxial tensile strength of ≥100 MPa, an air permeability of 300 s/100 cc, and a breaking temperature of ≥170° C.

The present invention also provides a method for preparing the aforesaid lithium-ion battery separator with high-temperature resistance:

mixing, melting, and plasticizing, by mass percent, 20%-60% of a polypropylene main material, 2%-10% of a solubilizer, 30%-80% of a solvent, 0.1%-5% of a nucleating aid and/or 0.1%-1% of an antioxidant, carrying out twin-screw extrusion, carrying out thermally induced phase separation to obtain a cast sheet, and then carrying out cast sheet stretching, extraction, and after extraction, carrying out post-treatment such as dry film stretching, retraction, and heat setting; alternatively, carrying out directly extraction on the cast sheet obtained by thermally induced phase separation, and after extraction, carrying out post-treatment such as dry film stretching, retraction, and heat setting.

Preferably, the mass percentages of the polypropylene main material, the solubilizer, the solvent, the nucleating aid, and the antioxidant are 25%-40%, 3%-6%, 50%-70%, 0.2%-3%, and 0.1%-0.5%, respectively.

Further, the polypropylene may be a single component with an MI (melt index) of less than 20 g/10 min or is a mixture of a plurality of polypropylenes with different melt indices.

Preferably, the polypropylene is a single component with an MI of less than 2 g/10 min or a mixture of the component and a polypropylene with an MI of less than 0.5 g/10 min The solubilizer is a solubilizer component with good co-solubility for long straight-chain hydrocarbon chain segments and/or branched hydrocarbon chain segments.

Preferably, the solubilizer comprises a polyolefin copolymer and/or a polyolefin wax.

Preferably, the solubilizer comprises one or more of a polyethylene/propylene copolymer, a polypropylene/ethylene-butene copolymer, a polypropylene/ethylene-hexene copolymer, a polyethylene wax, a polypropylene wax, and a polyester wax. The solubilizer of the system can greatly enhance the plasticizing effect.

The solvent comprises one or more of alkanes, esters, ethers, and aromatics.

Preferably, the solvent comprises one or more of liquid paraffin, solid paraffin, paraffin oil, natural vegetable oil, dimethyl phthalate, diethyl phthalate, dibutyl phthalate, dioctyl phthalate, dioctyl sebacate, methyl salicylate, diphenyl ether, and diphenylmethane. The solvent is suitable for thermally induced phase separation.

The nucleating aid comprises one or more of adipic acid, calcium stearate, aluminum stearate, sorbitol benzylidene derivatives, sodium benzoate and aluminum bis (p-tert-butylbenzoate) carboxylate.

Preferably, the nucleating aid is his (3, 4-dimethylbenzylidene) sorbitol.

The nucleating aid is generally only used in dry separator production. By using the polypropylenes with different melt indices or a mixture thereof and the solubilizer and solvent matching system, the present invention can balance and ensure the normal plasticizing effect and casting effect, and can also help control the nucleation and crystallization effect, control the crystal form and size in the wet thermally induced phase separation process, and facilitate the subsequent processing such as stretching. The combination of the main material, solubilizer, solvent, and nucleating aid can form a delicate balance, so as to maintain the high biaxial strength of the film, and also has the advantages of high porosity, uniform, and adjustable pore size.

The antioxidant aid includes one of antioxidant 1076, antioxidant 1010, and antioxidant 168.

The pre-extrusion feeding made adopts synchronous feeding and/or asynchronous feeding.

Preferably, during the twin screw extrusion process, a screw temperature is 140° C.-240° C., a melt channel temperature is 190° C.-230° C., and a die head temperature is 180° C.-220° C.

Preferably, the extruded melt has a thickness of 0.7 mm-5 mm.

Preferably, during the preparation of the cast sheet, a rotation speed of the co-rotating twin screw is 60-100 rmp.

Preferably, a cooling process is also comprised after the extrusion; the cooling mode comprises chill roll cooling 10° C.-80° C., chill roll cooling+backup roller cooling 10° C.-80° C., chill roll+water cooling 5° C.-80° C., water cooling+bottom roll cooling 5° C.-80° C., chill roll+oil cooling 5° C.-80° C. and/or oil cooling+bottom roll cooling 5° C.-80° C.

Preferably, the stretching of the cast sheet includes maintaining an air temperature of 130° C.-165° C. and a film surface temperature of 124° C.-140° C., and stretching at a stretching speed of 3 m/min-40 m/min by 1-30 times in an MD, by 1-30 times in a TD, and/or by (1-30)*(1-30) times in a biaxial synchronous direction, with "stretching by 1 time" indicating that no stretching is carried out in this direction. The stretching process can be achieved by different combination methods of MD stretching, TD stretching, MD and TD synchronous stretching, and multiple MD-TD stretching superposition, and different wind temperature, wind speed, and stretching speed, so as to realize the stretching of the crystals in the cast sheet, the expansion, dislocation, and slippage of the platelets, and finally realize the fiberized, space network structure, thereby obtaining the high-temperature resistant polyolefin porous film precursor with different porosity, different pore size, and different strength.

Preferably, the stretched trimmings are not cut in advance during the extraction. The stretched trimmings are not cut in advance during the extraction and, drying. The TD shrinkage of the film during extraction is inhibited by the greater tension of the thick trimmings, because the extraction shrinkage will lead to the increased TD range and poor uniformity of the film, seriously affecting the stability of the polypropylene film.

Preferably, the post-treatment includes dry film biaxial stretching and retractive heat-setting.

More preferably, the post-treatment includes sequentially performing a dry film MD-TD biaxial stretching, an MD-TD biaxial retracting treatment, and a heat-setting. By stretching and retracting the dry film after extraction, the secondary crystallization of microfibrillated polypropylene, the fine denier of microfibers, and the elimination of internal stress can be achieved, so as to achieve the purposes of pore expansion and heat setting, improve the permeability of the separator and improve the thermal stability. The MD-TD biaxial retracting treatment and heat setting, based on the traditional ID uniaxial retracting treatment method, can make the MD of the film material be retracted at the same time, which can improve the biaxial thermal shrinkage stability at the same time. The specific methods are as follows: the dry film MD-TD biaxial stretching comprises maintaining the air temperature of 130° C.-175° C. and the film surface temperature of 125° C.-150° C., and stretching at the stretching speed of 3 m/min-40 m/min by (1-30) times in the MD, by (1-30) times in the TD, and/or by (1-30)*(1-30) times in the biaxial synchronous direction, with "stretching 1 time" indicating that no stretching is performed in this direction, and the stretching process can achieve the required stretching times by different combination methods of MD stretching, TD stretching, MD and TD synchronous stretching, and multiple MD-TD stretching superpositions. MD-TD biaxial retracting comprises maintaining the wind temperature of 130° C.-175° C. and the film surface temperature of 125° C.-150° C., and retracting at a retraction speed of 3 m/min-20 m/min by 1-3 times in the MD, by 1-3 times in the TD and/or (1-3)*(1-3) times in the biaxial synchronous direction, with "retracting 1 time" indicating that no retraction is performed in that direction.

The present invention also provides a lithium-ion battery manufactured using the lithium-ion battery separator with high-temperature resistance.

Compared with the prior art, the present invention, by combining the advantages of good heat resistance of the main material of the dry polypropylene separator and uniform microstructure and high strength of the wet biaxially oriented polyethylene separator, pioneering achieves the production of a wet biaxially oriented polypropylene separator with a large rate of stretching achieving the balance of heat resistance, mechanical strength and uniform and controllable microstructure of micropores, and obtaining a novel lithium-ion battery separator having the characteristics of high-temperature resistance, biaxial high strength, high porosity, uniform and adjustable pore size, and high specific resistance. Meanwhile, the separator according to the present invention can also be applied to the fields of liquid, gas dust particle filtration and waterproof and breathable films due to its high-temperature resistance, high porosity and controllable pore size.

BRIEF DESCRIPTION OF DRAWINGS

In order to more clearly illustrate the technical solutions of the embodiments of the present invention, the following is a brief introduction to the drawings used in the embodiments. It should be understood that the following drawings only show some embodiments of the invention, so they should not be regarded as limiting the scope. Other related drawings can be obtained from these drawings without involving any inventive effort for a person skilled in the art.

DETAILED DESCRIPTION OF THE EMBODIMENTS

Figure 1:
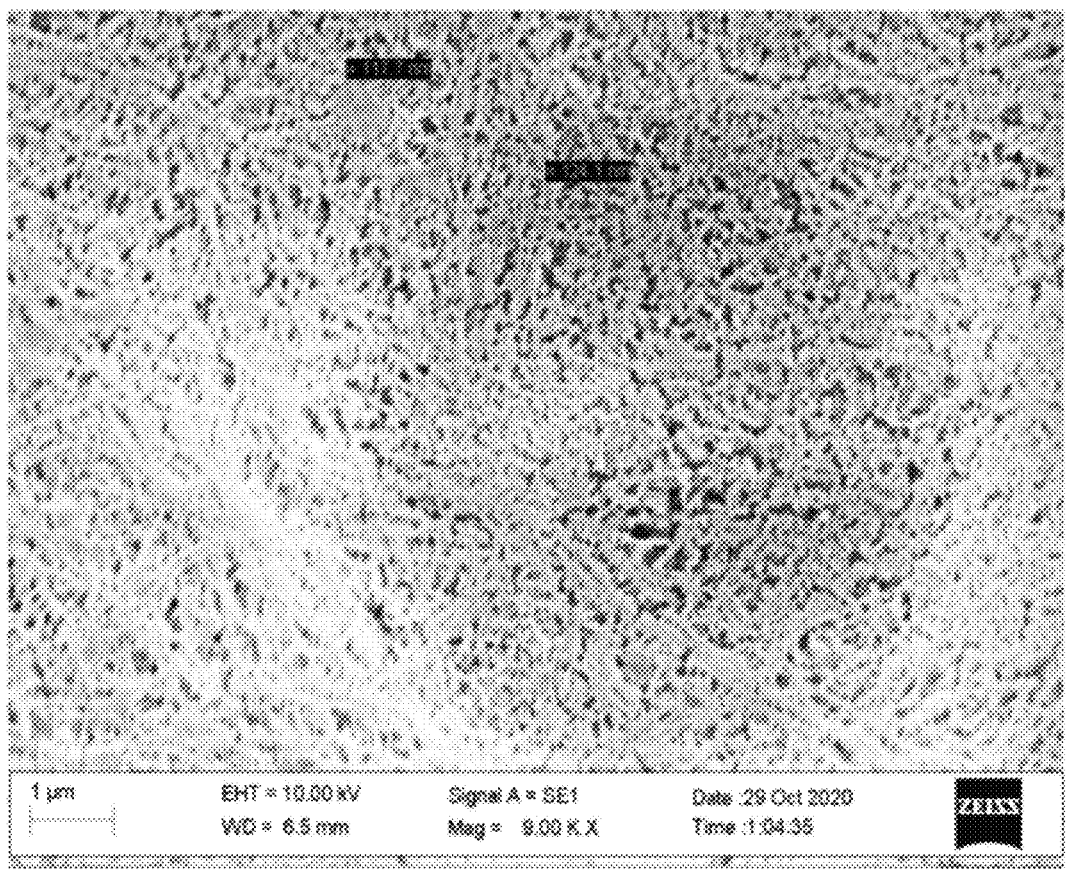
FIG. 1 is a scanning electron micrograph of a polypropylene microporous film of Example 2 of the present invention.

Reference will now be made in detail to the embodiments of the present invention, examples of which are illustrated in the accompanying drawings, wherein the sane or similar reference numerals refer to the same or similar elements or elements having the same or similar functions throughout the several views. The embodiments described below with reference to the drawings are illustrative only and are not to be construed as limiting the invention.

As used herein, the term:
"prepared from . . . " is synonymous with "comprising"
As used herein, the terms "comprise", "comprising", "includes", "including", "has", "having" or any other variation thereof, are intended to cover a non-exclusive inclusion. For example, the composition, step, method, product or device containing the listed elements need not be limited to those elements, but may include other elements not explicitly listed or elements inherent in such composition, step, method, product or device.

The transitional phrase "consisting of . . . " excludes any element, step, or component not specified. If used in a claim, this phrase shall close the claim to the inclusion of materials other than those described except for conventional impurities associated therewith. When the phrase "consisting of . . . " appears in a clause of the body of a claim, rather than immediately following the subject matter, it limits only the element set forth in that clause; other elements are not excluded from the claims as a whole.

When an equivalent, concentration, or other value or parameter is expressed as a range, preferred range, or range bounded by a series of upper preferable values and lower preferable values, this is to be understood as specifically disclosing all ranges formed from any pair of any upper range limit or preferred value and any lower range limit or preferred value, regardless of whether ranges are separately disclosed. For example, when a range of "1-5" is disclosed, the recited range should be interpreted to include the ranges "1 to 4", "1 to 3", "1 to 2", "1 to 2, and 4 to 5", "1 to 3 and 5" etc. Where a range of numerical values is recited herein unless otherwise stated, the range is intended to include the endpoints thereof, and all integers and fractions within the range.

In these examples, the parts and percentages are by mass unless otherwise indicated.

"And/or" is used to indicate that one or both of the stated cases may occur, e.g. A and/or B includes (A and B) and (A or B).

Example 1

By means of synchronous feeding and asynchronous feeding, 30% of polypropylene with an MI of 0.5 g/10 min, 5% of polyethylene/propylene copolymer, and 63.8% of 100 #white oil, by mass percent, were respectively fed into a twin-screw extruder through a powder weigher and a plunger pump, and 1% of bis (3,4-dimethylphenylene) sorbitol (i.e. 3988 nucleating agent) and 2% of 1076 antioxidant were added for melt plasticization at 190° C. Wherein the screw temperature was 220° C., the melt channel temperature was 200° C., and the die head temperature was 195° C. The co-rotating twin-screw speed was 90 rmp.

The melt was extruded from the die head to form a sheet, and the gel-like sheet was immediately passed through a preset gap between a setting roll (chill roll) and backup roller of a casting machine (surface temperatures of the setting roll and the backup roller were set to 15° C.). In this example, a cooling tank (water as the cooling medium) was also added to forcibly cool the reverse side of the melt. The temperature of the cooling tank was 20° C., and the casting sheet with a thickness of 1.5 mm was formed. Subsequently, at an air temperature of 160° C., the cast sheet was stretched 6 times in the machine direction (MD) at a film surface temperature of 130° C. using an MD stretcher at a speed of 30 m/min and further stretched 6 times in the width direction (TD) at a film surface temperature of 140° C. using a TD stretcher at a speed of 30 m/min. The stretched oil film was then trimmed and cut into three sections, each section having a width of 800 mm, using a slitting machine. Then, the stretched oil film was passed through an extraction tank containing methylene chloride to extract the white oil from the oil film and dry the oil film. The resulting dried microporous film entered a TD stretcher and was stretched 1.2 times in the TD direction at 135° C. and then retracted to 1.1 times in the TD direction while being heat set at 135° C., Subsequently, winding was performed with a wind-up roll to obtain a polypropylene microporous film having a thickness of 15.6 µm.

Thickness, tensile strength, puncture strength, porosity, gas permeability and heat shrinkage of the prepared polypropylene microporous film were measured, respectively. The measured results are shown in Table 1. Meanwhile, a corresponding high-temperature-resistant lithium-ion battery can be prepared using the polypropylene microporous film.

Example 2

By means of synchronous feeding and asynchronous feeding, 311% of polypropylene, 6% of polypropylene/ethylene-butene copolymer, and 61.55% of 100 #white oil, by mass percent, were respectively fed into a twin-screw extruder through a powder weigher and a plunger pump, and 1.1% of bis (3,4-dimethylphenylene) sorbitol (i.e. 3988 nucleating agent) and 3.5% of 1076 antioxidant were added for melt plasticization at 185° C. Wherein the polypropylene is a mixture of polypropylenes with melt indices of 0.5 g/10 min and 2 g/10 min, respectively, with a ratio of 8:2. The screw temperature was 210° C., the melt channel temperature was 200° C., and the die head temperature was 195° C. The co-rotating twin-screw speed was 80 rmp.

The melt was extruded from the die head to form a sheet, and the gel-like sheet was immediately passed through a preset gap between a setting roll (chill roll) and a backup roller of a casting machine (surface temperatures of the setting roll and the backup roller were set to 10° C.). In this example, a cooling tank (water as the cooling medium) was also added to forcibly cool the reverse side of the melt. The temperature of the cooling tank was 15° C., and the casting sheet with a thickness of 0.8 mm was formed. Subsequently, at an air temperature of 130° C. the cast sheet was stretched 9 times in the machine direction (MD) at a film surface temperature of 130° C. using an MD stretcher at a speed of 35 m/min and further stretched 7 times in the width direction (TD) at a film surface temperature of 140° C. using a TD stretcher at a speed of 35 m/min. The stretched oil film was then cut into three sections, each section having a width of 800 mm using a slitting machine. Then, the stretched oil film was passed through an extraction tank containing methylene chloride to extract the white oil from the oil film and dry the oil film. The resulting dried microporous film entered a TD stretcher and was stretched 1.2 times in the TD direction at 135° C. and then retracted to 1.1 times in the TD direction while being heat set at 135° C. Subsequently, winding was performed with a wind-up roll to obtain a polypropylene microporous film having a thickness of 9.4 µm.

Thickness, tensile strength, puncture strength, porosity, gas permeability and heat shrinkage of the prepared polypropylene microporous film were measured, respectively. The measured results are shown in Table 1, and the electron micrograph is shown in FIG. 1. Meanwhile, a corresponding high-temperature-resistant lithium-ion battery can be prepared using the polypropylene microporous film.

Example 3

By means of synchronous feeding, 35% of polypropylene, 3% of polyethylene wax, and 59.5% of liquid paraffin, by mass percent, were respectively fed into a twin-screw extruder through a powder weigher and a plunger pump, and 2% of adipic acid and 5% of 1010 antioxidant were added for melt plasticization at 190° C., Wherein the polypropylene is a mixture of polypropylenes with melt indices of 0.5 g/10 min and 2 g/10 min, respectively, with a ratio of 6:4. The screw temperature was 205° C., the melt channel temperature was 205'C, and the die head temperature was 190° C. The co-rotating twin-screw speed was 100 rmp.

The melt was extruded from the die head to form a sheet, and the gel-like sheet was immediately passed through a preset gap between a setting roll (chill roll) and a backup roller of a casting machine (surface temperatures of the setting roll and the backup roller were set to 20° C.). In this example, a cooling tank (water as the cooling medium) was also added to forcibly cool the reverse side of the melt. The temperature of the cooling tank was 15° C., and the casting sheet with a thickness of 0.9 mm was formed. Subsequently, at an air temperature of 165° C., the cast sheet was stretched 9 times in the machine direction (MD) at a film surface temperature of 130° C. using an MD stretcher at a speed of 40 m/min and further stretched 7 times in the width direction (TD) at a film surface temperature of 140° C. using a TD stretcher at a speed of 40 m/min. The stretched oil film was then trimmed and cut into three sections, each section having a width of 800 mm, using a slitting machine. Then, the stretched oil film was passed through an extraction tank containing methylene chloride to extract the white oil from the oil film and dry the oil film. The resulting dried microporous film entered, a TD stretcher and was stretched 1.2 times in the TD direction at 135° C. and then retracted to 1.1 times in the TD direction while being heat set at 135'C. Subsequently, winding was performed with a wind-up roll to obtain a polypropylene microporous film having a thickness of 10.7 µm.

Thickness, tensile strength, puncture strength, porosity, gas permeability and heat shrinkage of the prepared polypropylene microporous film were measured, respectively. The measured results are shown in Table 1. Meanwhile, a corresponding high-temperature-resistant lithium-ion battery can be prepared using the polypropylene microporous film.

Example 4

By means of synchronous feeding and asynchronous feeding, 30% of polypropylene with an MI of 0.5 g/10 min, 5% of polyethylene/propylene copolymer, and 63.8% of 100 #white oil, by mass percent, were respectively fed into a twin-screw extruder through a powder weigher and a plunger pump, and 1% of bis (3,4-dimethylphenylene) sorbitol (i.e. 3988 nucleating agent) and 2% of 1076 antioxidant were added for melt plasticization at 190° C. Wherein the screw temperature was 220° C., the melt channel temperature was 200° C., and the die head temperature was 195° C. The co-rotating twin-screw speed was 90 rmp.

The melt was extruded from the die head to form a sheet, and the gel-like sheet was immediately passed through a preset gap between a setting roll (chill roll) and a backup roller of a casting machine (surface temperatures of the setting roll and the backup roller were set to 40° C.). In this example, a cooling tank (water as the cooling medium) was also added to forcibly cool the reverse side of the melt. The temperature of the cooling tank was 20° C., and the casting sheet with a thickness of 0.7 mm was formed. Subsequently, the resulting cast sheet was then passed through a clean dichloromethane ultrasonic extraction tank at a speed of 2 m/min for extraction. At an air temperature of 162° C., the extracted cast sheet was stretched 7 times in the machine direction (MD) at a film surface temperature of 133° C. using an MD stretcher at a speed of 30 m/min and further stretched 7 times in the width direction (TD) at a film surface temperature of 140° C. using a TD stretcher at a speed of 30 m/min. Then, the waterproof and breathable film formed by stretching was trimmed. The resulting trimmed film entered a TD stretcher and was stretched 1.2 times in the ID direction at 135° C. and then retracted to 1.1 times in the ID direction while being heat set at 135° C. Subsequently, winding was performed with a wind-up roll to obtain a polypropylene microporous film having a thickness of 14.3 μm.

Figure 2:
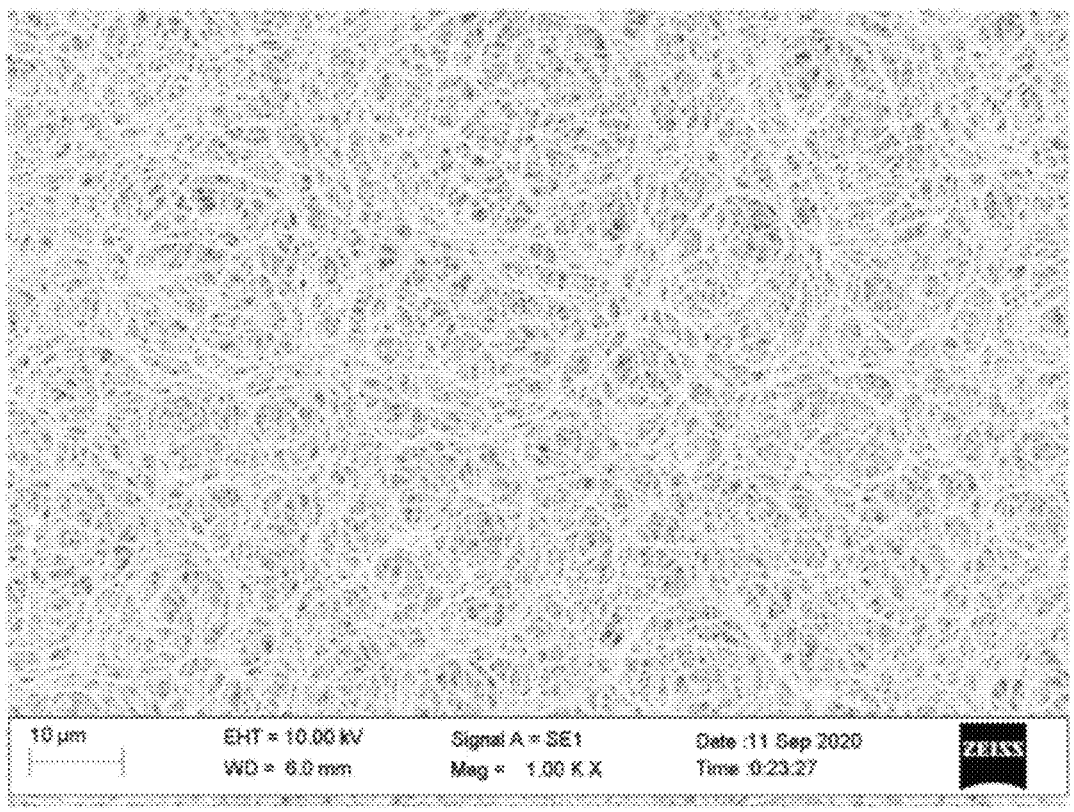
FIG. 2 is a scanning electron micrograph of a polypropylene microporous film of Example 4 of the present invention.

Thickness, tensile strength, puncture strength, porosity, gas permeability and heat shrinkage of the prepared polypropylene microporous film were measured, respectively. The measured results are shown in Table 1, and the electron micrograph is shown in FIG. 2. Meanwhile, a corresponding high porosity film material can be prepared using the polypropylene microporous film.

Example 5

By means of synchronous feeding and asynchronous feeding, 30% of polypropylene with an MI of 0.5 g/10 min. 5% of polyethylene/propylene copolymer, and 63.8% of 100 #white oil, by mass percent, were respectively fed into a twin-screw extruder through a powder weigher and a plunger pump, and 1% of bis (3,4-dimethylphenylene) sorbitol (i.e. 3988 nucleating agent) and 2% of 1076 antioxidant were added for melt plasticization at 190° C. Wherein the screw temperature was 220° C., the melt channel temperature was 200° C., and the die head temperature was 195° C. The co-rotating twin-screw speed was 90 rmp.

The melt was extruded from the die head to form a sheet, and the gel-like sheet was immediately passed through a preset gap between a setting roll (chill roll) and a backup roller of a casting machine (surface temperatures of the setting roll and the backup roller were set to 15° C.). In this example, a cooling tank (water as the cooling medium) was also added to forcibly cool the reverse side of the melt. The temperature of the cooling tank was 20° C., and the casting sheet with a thickness of 1.9 mm was formed. Subsequently, at an air temperature of 160° C. the cast sheet was stretched 3*3 times in the machine direction (MD*TD) at a film surface temperature of 130° C. using a biaxial synchronous stretcher at a speed of 10 m/min to obtain a thick oil film. At an air temperature of 158° C., the thick oil film resulted from stretching was stretched 7 times in the machine direction (MD) at a film surface temperature of 129° C. using an MD stretcher at a speed of 60 m/min, and further stretched 7 times in the width direction (TD) at a film surface temperature of 137° C. using a TD stretcher at a speed of 60 m/min. The stretched oil film was then trimmed and cut into three sections, each section having a width of 800 mm, using a slitting machine. Then, the stretched oil film was passed through an extraction tank containing methylene chloride to extract the white oil from the oil film and dry the oil film. The resulting dried microporous film entered a TD stretcher and was stretched 1.2 times in the TD direction at 135° C. and then retracted to 1.1 times in the TD direction while being heat set at 135° C. Subsequently, winding was performed with a wind-up roll to obtain a polypropylene microporous film having a thickness of 3.9 pnm.

Thickness, tensile strength, puncture strength, porosity, gas permeability, and heat shrinkage of the prepared polypropylene microporous film were measured, respectively. The measured results are shown in Table L. Meanwhile, a corresponding high-temperature-resistant lithium-ion battery can be prepared using the polypropylene microporous film.

Comparative Example 1

In contrast to Example 1, the main material was PE and was made in a wet process.

Comparative Example 2

In contrast to Example 1, the main material was PP, made in a dry process.

TABLE 1

Test Results for examples in Table 1 and Comparative examples

| ITEM | Ex. 1: | Ex. 2: | Ex. 3: | Ex. 4: | Ex. 5: | Comp. Ex. 1 | Comp. Ex. 2 |
|---|---|---|---|---|---|---|---|
| Thickness (μm) | 15.6 | 9.4 | 10.7 | 14.3 | 3.9 | 9.27 | 22 |
| Air Permeability Value (S/100 cc) | 220 | 180 | 190 | 100 | 110 | 156 | 440 |
| Areal density (G/m$^2$) | 9.1 | 5.5 | 5.7 | 8.7 | 2.5 | 5.3 | 13.2 |
| Porosity (%) | 43.1 | 44.9 | 42.7 | 65.3 | 32.3 | 40.4 | 40.3 |
| Puncture strength (%) | ≥450 | ≥380 | ≥400 | ≥380 | ≥300 | ≥500 | ≥370 |
| TD Tensile Strength (MPa) | ≥120 | ≥130 | ≥130 | ≥50 | ≥200 | ≥190 | ≥0.4 |
| MD Tensile Strength (MPa) | ≥130 | ≥145 | ≥145 | ≥50 | ≥200 | ≥200 | ≥132 |
| Td Heat Shrink @ 130° C 1 h (%) | ≤1 | ≤1 | ≤1 | ≤1.5 | ≤1.5 | ≤2 | ≤5 |
| MD Heat Shrink @ 130° C. 1 h (%) | ≤1 | ≤1 | ≤1 | ≤1.5 | ≤1.5 | ≤3 | ≤5 |
| TD Heat Shrink @ 150° C 1 h (%) | ≤5 | ≤5 | ≤5 | ≤5 | ≤5 | ≥15 | ≤5 |

TABLE 1-continued

Test Results for examples in Table 1 and Comparative examples

| ITEM | Ex. 1: | Ex. 2: | Ex. 3: | Ex. 4: | Ex. 5: | Comp. Ex. 1 | Comp. Ex. 2 |
|---|---|---|---|---|---|---|---|
| MD Heat Shrink @ 150° C 1 h (%) | ≤5 | ≤5 | ≤5 | ≤5 | ≤5 | ≥15 | ≥15 |
| Breaking temperature (° C.) | ≥170 | ≥175 | ≥175 | ≥170 | ≥175 | ≥165 | ≥165 |
| Average pore size (nm) | 98 | 115 | 110 | 1650 | 105 | 85 | 900 |

It can be seen from the comparison of the data in table 1 and FIG. 1 that the polypropylene separator of the present invention has good heat resistance, uniform microstructure, high strength, and pioneeringly achieves the product of a wet biaxial large-rate stretched polypropylene separator, achieving the balance of heat resistance, mechanical strength, and microscopic uniformity and controllability, and obtaining a novel lithium-ion battery separator having the characteristics of high-temperature resistance, biaxial high strength, uniform pore size, and high specific resistance; at the same time, the processing speed is fast and the processing cost is low.

In the description of this specification, references to descriptions of the terms "one embodiment", "so-me embodiments", "example". "specific examples", or "some examples", etc. mean that a particular feature, structure-, material, or characteristic described in connection with the embodiment or example is included in at least one embodiment or example of the present invention. In this description, schematic representations of the terms above do not necessarily refer to the same embodiment or example. Furthermore, the particular features, structures, materials, or characteristics described may be combined in any suitable manner in any one or more embodiments or examples. Further, the different embodiments or examples and the features of the different embodiments or examples described in this description can be integrated and combined by a person skilled in the art without contradicting each other.

While examples of the present invention have been shown and described, it will be understood that the above-described embodiments are illustrative and not restrictive, and that changes, modifications, substitutions and alterations may be made by those skilled in the art without departing from the scope of the present invention.

What is claimed is:

1. A method for preparing a separator for a lithium-ion battery having temperature resistance, comprising: mixing, melting, and plasticizing, in mass percentage, 20%-60% of a polypropylene main material, 2%-10% of a solubilizer, 30%-80% of a solvent, 0.1%-5% of a nucleating aid and/or 0.1%-1% of an antioxidant, carrying out twin-screw extrusion, and carrying out thermally induced phase separation to obtain a cast sheet; and
  carrying out cast sheet stretching, extraction, and post-treatment, or
  directly carrying out extraction and post-treatment,
  wherein a pre-extrusion feeding mode is synchronous feeding and asynchronous feeding;
  wherein, during the twin-screw extrusion process, a screw temperature is 140° C.-240° C., a melt pipe temperature is 190° C.-230° C., and a die head temperature is 180° C.-220° C.;
  wherein, the cast sheet stretching comprises maintaining an air temperature of 130° C.-165° C. and a film surface temperature of 124° C.-140° C., and stretching at a stretching speed of 3 m/min-60 m/min by 1-30 times in a Machine Direction (MD), by 1-30 times in a transverse direction (TD), and/or by (1-30)*(1-30) times in a biaxial synchronous direction;
  wherein, the post-treatment comprises successively performing a dry film MD-TD biaxial stretching, an MD-TD biaxial retracting, and a heat-setting, wherein the dry film MD-TD biaxial stretching comprises maintaining the air temperature of 130° C.-175° C. and the film surface temperature of 125° C.-150° C., and stretching at the stretching speed of 3 m/min-40 m/min by (1-30) times in the MD, by (1-30) times in the TD, and/or by (1-30)*(1-30) times in the biaxial synchronous direction; the MD-TD biaxial retracting comprises maintaining wind temperature of 130° C.-175° C. and the film surface temperature of 125° C.-150° C., and retracting at a retraction speed of 3 m/min-20 m/min by 1-3 times in the MD retraction, by 1-3 times in the TD retraction and/or (1-3)*(1-3) times in the biaxial synchronous direction;
  wherein, the polypropylene is a single component with a melt index of less than 2 g/10 min or a mixture of the component and a polypropylene with a melt index of less than 0.5 g/10 min;
  wherein, the nucleating aid comprises one or more of adipic acid, calcium stearate, aluminum stearate, sorbitol benzylidene derivatives, sodium benzoate, and aluminum bis (p-tert-butylbenzoate) carboxylate;
  wherein, the solubilizer comprises one or more of a polyethylene/propylene copolymer, a polypropylene/ethylene-butene copolymer, a polypropylene/ethylene-hexene copolymer, a polyethylene wax, a polypropylene wax, and a polyester wax; and
  wherein, the separator has a thickness of 3.5-30 μm, a porosity of 30-80%, an adjustable pore size of 20-2000 nm, a biaxial tensile strength of ≥50 MPa, an air permeability of ≤400 s/100 cc, and a breaking temperature of ≥160° C.

2. The method according to claim 1, wherein the mass percentages of the polypropylene main material, the solubilizer, the solvent, the nucleating aid, and the antioxidant are 25%-40%, 3%-6%, 50%-70%, 0.2%-3%, and 0.1%-0.5%, respectively.

3. The method according to claim 1, wherein the solvent comprises one or more of alkanes, esters, ethers, and aromatic compounds.

4. The method according to claim 3, wherein the solvent comprises one or more of liquid paraffin, solid paraffin, paraffin oil, natural vegetable oil, dimethyl phthalate, diethyl phthalate, dibutyl phthalate, dioctyl phthalate, dioctyl sebacate, methyl salicylate, diphenyl ether, and diphenylmethane.

5. The method according to claim 1, wherein the nucleating aid is bis (3,4-dimethyl benzylidene) sorbitol.

6. The method according to claim 1, wherein the antioxidant comprises one of antioxidant 1076, antioxidant 1010, and antioxidant 168.

7. The method according to claim 1,
wherein, an extruded melt has a thickness of 0.7 mm-5 mm;
wherein, during the preparation of the cast sheet, a rotation speed of a co-rotating twin screw is 60-100 rmp;
wherein, a cooling process is also comprised after the extrusion; the cooling mode comprises chill roller cooling 10° C.-80° C., chill roller cooling+backup roller cooling 10° C.-80° C., chill roller+water cooling 5° C.-80° C., water cooling+bottom roller cooling 5° C.-80° C., chill roller+oil cooling 5° C.-80° C. and/or oil cooling+bottom roller cooling 5° C.-80° C.; and
wherein, during the extraction, stretched trimmings are not cut in advance.

\* \* \* \* \*